A. J. MUSSELMAN.
LUGGAGE CARRIER.
APPLICATION FILED JAN. 14, 1914.
1,154,197.
Patented Sept. 21, 1915.
2 SHEETS—SHEET 2.
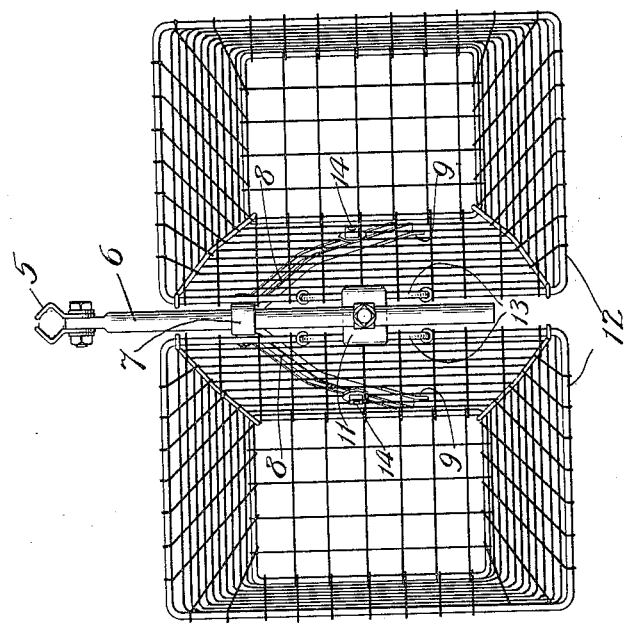
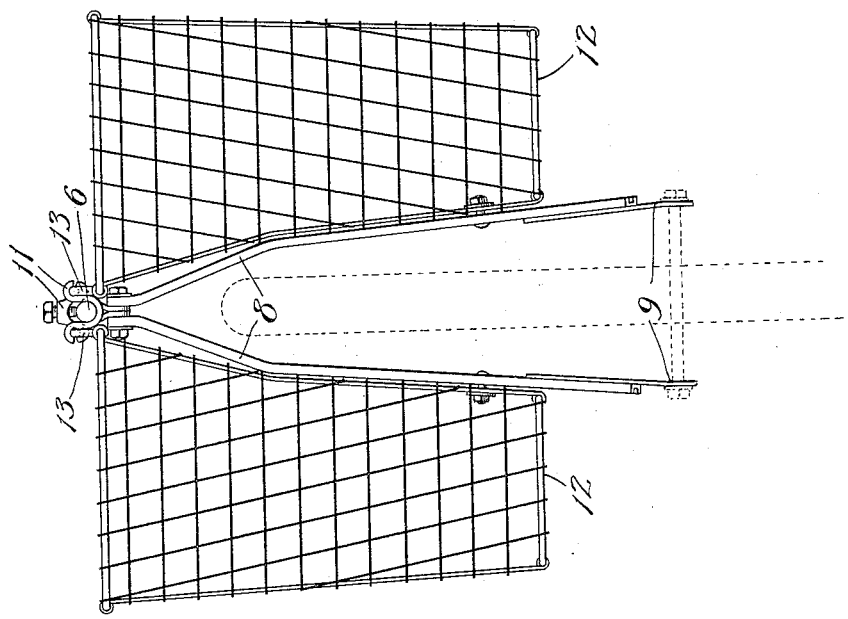
Witnesses:
Inventor:
Alvin J. Musselman,
by Dyrenforth, Lee, Chritton and Wiles
Attys.

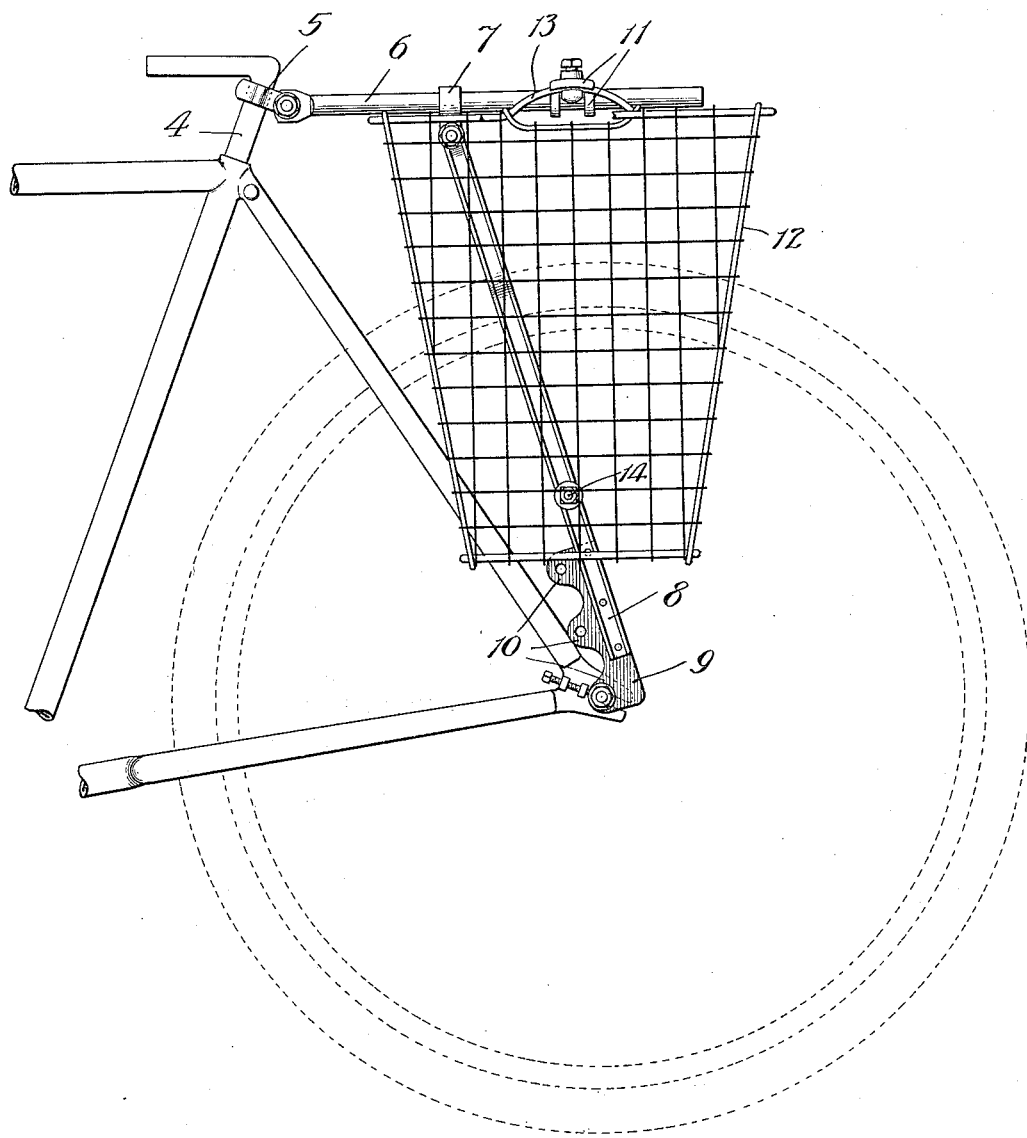

UNITED STATES PATENT OFFICE.

ALVIN J. MUSSELMAN, OF CHICAGO, ILLINOIS, ASSIGNOR TO CYCLE MFG. & SUPPLY COMPANY, OF CHICAGO, ILLINOIS, A CORPORATION OF SOUTH DAKOTA.

LUGGAGE-CARRIER.

1,154,197.          Specification of Letters Patent.     Patented Sept. 21, 1915.

Application filed January 14, 1914. Serial No. 812,067.

*To all whom it may concern:*

Be it known that I, ALVIN J. MUSSELMAN, a citizen of the United States, residing at Chicago, in the county of Cook and State of Illinois, have invented a new and useful Improvement in Luggage-Carriers, of which the following is a specification.

My invention relates to certain new and useful improvements in luggage carriers and is fully described and explained in the specification and shown in the accompanying drawings, in which:

Figure 1 is a side elevation of the rear portion of a bicycle with my luggage-carrier attached thereto; Fig. 2 is a rear elevation, and Fig. 3 is a top plan thereof.

Referring to the drawings, 4 is the seat-post of the bicycle to which the device is attached. The seat-post supports a clamp 5 from which extends in a rearward direction a horizontal bar 6. This bar carries a clamp 7 to which are attached two downwardly-extending members 8, each formed of outwardly-facing channel-iron in the preferred form of construction, each of the members 8 terminating at its lower end in a plate 9 having on its forward edge a series of perforated ears 10 which are adapted to engage the ends of the bicycle axle. By engaging one or another of the ears with the axle, a device of a given size accommodates itself to a frame of any given height, any trifling irregularities being taken care of by shifting the clamp 7 along the bar 6, in an obvious manner.

For the purpose of supporting the luggage-carrying baskets, there is mounted on the rear end of the bar 6, an ordinary bicycle seat-clamp 11, which, however, is in inverted position. These clamps are in common use for holding the wires of a two-wire saddle, in which case they are placed with the clamping bolt underneath the seat-post. In the present case, however, since the baskets extend downward from the clamp and are hung thereon, the clamp is turned over. 12 are the two baskets, the same being made of wire and preferably of the general form shown. They are hollowed out on their sides adjacent to the wheel to enable them to fit over the members 8, as shown in Fig. 2. Each of these baskets, like similar wire structures, is surrounded at its upper edge by a heavy wire, and the wires, on the sides adjacent to the wheel, are provided with upwardly extending loops 13, adapted to be engaged by the clamp 11. For the purpose of holding the baskets firmly in position and preventing them from swinging outward laterally, each is held in position by bolts 14 passed through the adjacent member 8, a washer being provided to grip the wire of the basket between itself and the member 8, in an obvious manner. By this construction, there is provided a luggage-carrier of very large capacity which will carry a weight as heavy as can be borne safely by the back-wheel and tire of a bicycle. The luggage-carrier is of very firm and substantial construction and, under the ordinary shocks and strains subjected to it in use, is more durable than the bicycle structure itself. In its use the weight may be distributed symmetrically on the two sides of the wheel, so that a balance is preserved.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:—

1. In combination with a bicycle, a bar extending rearwardly from the seat-post, struts extending downwardly therefrom to maintain the same substantially horizontal, and containers supported by the bar and depending therefrom on the two sides of the wheel.

2. In combination with a bicycle, a bar extending rearwardly from the seat-post and clamped thereto at its forward end, struts extending downwardly therefrom to maintain the same substantially horizontal, and containers supported by the bar and depending therefrom on the two sides of the wheel, and having their depending portions bearing against the said struts.

3. In combination with a bicycle, a bar extending rearwardly from the seat-post, struts extending downwardly therefrom and engaging the ends of the bicycle-axle to maintain the bar substantially horizontal, and containers supported by the bar and depending therefrom on the two sides of the wheel, and having their depending portions bearing against the said struts.

4. In combination with a bicycle, a bar extending rearwardly from the seat-post, struts extending downwardly therefrom to maintain the same substantially horizontal, containers, each having a loop on its inner, upper edge, and a clamp on the bar engaging the loops to support the containers in depending position on the two sides of the wheel of the bicycle.

5. In combination with a bicycle, a bar extending rearwardly from the seat-post, struts extending downwardly therefrom to maintain the same substantially horizontal, containers, each having a loop on its inner, upper edge, a clamp on the bar engaging the loops to support the containers in depending position on the two sides of the wheel of the bicycle, and means to clamp the lower ends of the containers to the struts.

6. In combination with a bicycle, a bar extending rearwardly from the seat-post and clamped thereto at its forward end, struts extending downwardly from the bar and engaging the ends of the bicycle-axle to maintain the bar in horizontal position, containers, each having a loop on its inner, upper edge, and a clamp on the bar engaging the loops to support the containers in depending position on the two sides of the wheel of the bicycle.

In testimony whereof I have hereunto set my hand this 12th day of January, 1914.

ALVIN J. MUSSELMAN.

In presence of two subscribing witnesses:
GEORGE A. CHRITTON,
LOUIS HEISLAR.

Copies of this patent may be obtained for five cents each, by addressing the "Commissioner of Patents, Washington, D. C."